Feb. 21, 1928.
A. ROHRBACH
1,659,960
AIRCRAFT
Filed July 14, 1924
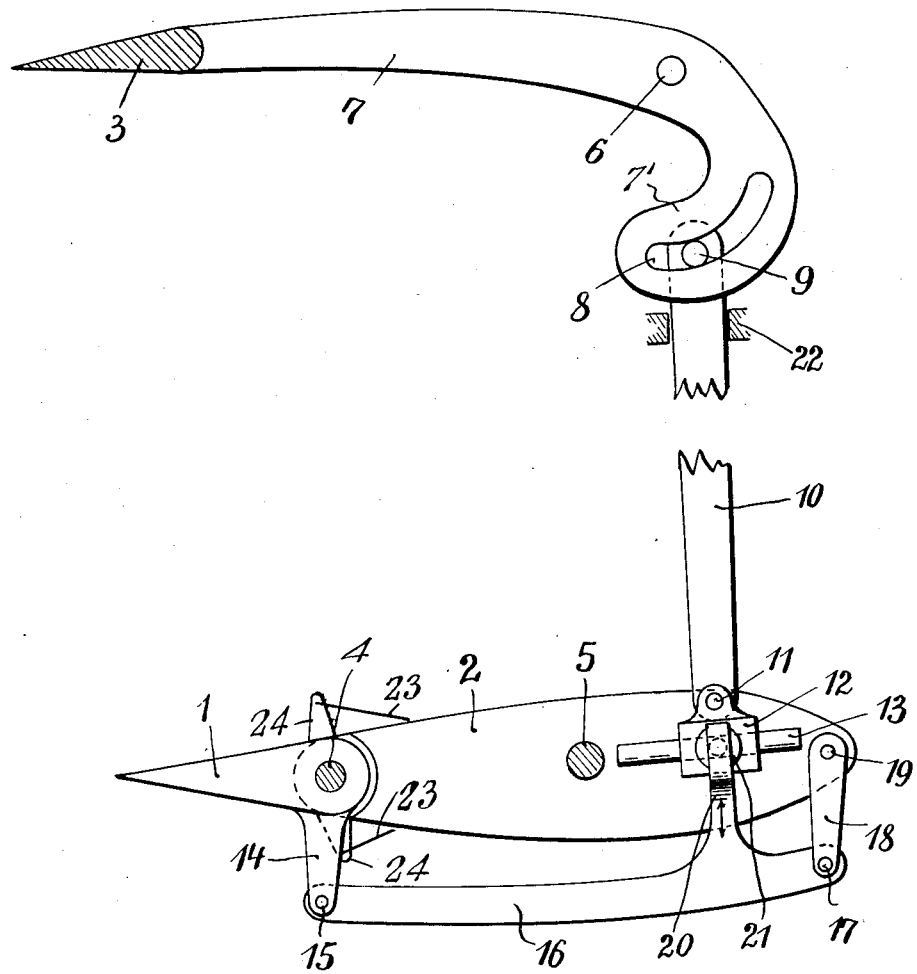
Inventor:
Adolf Rohrbach
attorney-
Chas. H. Keel Patented Feb. 21, 1928.

1,659,960

UNITED STATES PATENT OFFICE.

ADOLF ROHRBACH, OF BERLIN-WILMERSDORF, GERMANY.

AIRCRAFT.

Application filed July 14, 1924, Serial No. 725,834, and in Germany December 18, 1923.

It is a well known fact that too low a flying speed greatly endangers an airplane. A diminishing speed relative to the surrounding air is accompanied by an increase in the angle of incidence of the wings and it too often happens that the limit is reached, where the air-flow round the wing undergoes such a change, that the circulating current, producing the lift force, cannot increase in intensity with increasing angles of incidence. In this case air-flow no longer suffices to sustain the aircraft in normal flight, the speed being too low and the angle of incidence too large, and the aircraft "stalled" begins to lose height, its resultant movement being composed of the remaining flying movement and the falling movement. The resulting motion is most dangerous because of its instability, the effect of all controls at the same time being so small, when compared with the resulting unstable forces, that it is often difficult to effect a return to normal flight.

Speed-indicators and similar instruments have been provided for indicating to pilots the speed conditions of the craft, but experience has taught that a pilot, becoming aware of some obstacle in front, is often tempted to yield to his natural impulse and approach the dangerous place at the slowest possible rate, thus stalling the aeroplane and crashing down owing to a too great decrease of speed.

Then attempts have been made to change the qualities of the wings by means of slots or flaps or similar measures allowing the intensity of circulation or lift to increase up to very large angles of incidence, thus enabling the pilot to alight at a considerably lower speed. This, however, means but a shifting of the perilous zone. The pilot, getting accustomed to this new arrangement, will probably cause a sudden fall of the plane by excessive stalling of the machine at the newly established limit.

Considerable longitudinal stability of the craft, effected for example by correspondingly long fuselages and large horizontal tail planes, tends to prevent the pilot from taking perilously large angles of incidence, but there is a considerable drawback to such a great longitudinal stability in that the controllability of the plane is unduly impaired and pronounced pitching vibrations are present which create unsatisfactory flying conditions.

The object of the invention is to avoid crashes and stalling of an aeroplane due to unduly large angles of incidence and to this end I have provided means independent of the pilot for anticipating unduly large angles of incidence and enabling the operation of the controls to avoid the perilous angles which are about to be assumed. The invention may assume many forms but the particular embodiment of the invention herein exhibited includes a mechanism which functions to oppose the abnormal operation of the longitudinal controls. Such mechanism includes a control element which is so constructed and arranged as to be sensitive to changes in angles of incidence, such for example as a vane or other element under the influence of a free air current or flow and is responsive to unduly large angles of incidence to oppose the operation when perilous angles are or are about to be attained; and in the embodiment of the invention herein exhibited the opposing counteracting or nullifying action is positively effected by means under the control of the vane, as for example by an automatically adjustable fin or horizontal surface acting in opposition to the elevator effect when the latter is operated to unduly large degrees.

For a better understanding of the invention, reference may be had to the accompanying drawing diagrammatically illustrating one embodiment thereof.

Referring to the drawing I have diagrammatically illustrated a part of the longitudinal control mechanism including an elevator 1 which is pivoted on the axis 4 for up and down controlling movements. This elevator may be actuated for effecting the longitudinal control of the aircraft in any suitable manner, as for example by means of the cables 23 fastened to suitable arms 24 carried by the pivoted elevator 1. In the particular embodiment shown the elevator 1 is carried by a normally horizontal fin 2. At 3 I have indicated a safety rudder or actuating vane which in response to unduly large angles of incidence or angles of incidence approaching a predetermined value, functions to prevent the pilot from stalling the craft. In the particular embodiment illustrated this actuating vane 3 acts in opposition to the pilot by actuating the horizontal fin 2 in opposition to the abnormal movements of the elevator 1. This safety rudder or vane is carried by a main bearer 7 which is pivoted to any suitable stationary part of the aircraft at the axis 6. The bearer 7 on the opposite side of the axis 6 from the vane 3 carries an actuating cam 7', the latter including a curved slot 8. The part of this slot which is nearer the vane 3 is constructed substantially concentrically to the axis 6 or in the arc of a circle with its center at 6, while the other end or portion of the slot 8 is eccentric to and approaches the axis 6. The fin 2 is pivotally mounted on a stationary axis 5 and carries a slide or guide bolt 13 upon which slides the block 12. A bar 10 is pivotally connected to the slide block 12 at 11 and carries at its upper end a bolt 9 which operates within the slot 8 to lower and elevate the bar 10 in response to control movements,—there being a guide 22 diagrammatically illustrated and position near the upper end of the bar and bolt 9 to properly guide the upper end of the bar and the bolt 9. The slide block 12 is shifted back and forth along the guide 13 in response to the control of the elevator 1 for the purpose of bringing the block closer to or farther away from the axis 5 of the fin. The mechanism for this purpose is a bell crank lever 14 projecting from the elevator 1, a pivoted link 18 carried by the fin 2, a connecting link or arm 16 and forked arm 20 carried by the connecting link 16 and embracing the slide block 12. The fork 20 engages the block 12 by means of any suitable connections permitting the rocking back and forth of the fork and the sliding movements of the block, such for example as the rotatory guide pieces 21 disposed on opposite sides of the block, the arms of fork 20 catching into these rotatory guide pieces 21 and being guided thereby. The bell crank lever 14, the pivoted link 18 and the connecting link or rod 16 form a sort of parallelogram-like carrier for the forked arm 20 and the latter, by means of the connections generally indicated moves the block 12 back and forth along the guide 13 in response to the actuation and control of the elevator 1. The operation of the mechanism shown is as follows: The safety controlling vane 3 can move freely through small changes and angles of incidence without affecting the control mechanism, since as above indicated that part of the cam slot 8 which is functioning with the bolt 9 and bar 10 during such small changes in angles of incidence is concentrically arranged with reference to the axis 6. Larger angles of incidence, on the contrary, due for example to an exessive manipulation of the longitudinal controls, result in the vane 3 operating the controls or counteracting their effect so as to prevent such unduly large angles of incidence. If, for example, by reason of the excessive upward setting of the elevator 1 the largest permissible angle of incidence of the wings has been reached, the relative position of the craft and the vane 3 changes so materially that the rod 10 is pulled up by means of the bolt 9 riding up the cam slot 8,—this upward operation of the bar 10 tending to neutralize correspondingly the action of the elevator 1 by the manipulation of the fin 2 in the opposite direction. Notwithstanding, therefore, the unduly large controlling movements of the elevator 1, the aeroplane is then able to maintain a horizontal flight with the angle of incidence within the prescribed safe limits.

It is noted that in the specific form or embodiment of the safety control herein illustrated, that the larger the upward movements of the elevator 1 the larger are the corresponding neutralizing movements of the fin 2 for any definite upward movement of the bar 10 due to the fact that with the upward movements of the elevator 1 the slide block 12 approaches the axis 5. With small settings of the elevator 1, however, the actuating movements of the fin 2 by shifting of the sliding bolt 12 are insignificant.

The lengths of all levers and the form of the curved lengths are so selected that the safety rudder or actuating vane begins to work at a certain, but yet harmless angle of incidence. The pilot is entirely unhindered in pulling or pressing the elevator 1 to attain all ordinary and safe angles of incidence of the wings. However, as soon as the safety control begins to act, the angle of incidence cannot be increased any further, thereby avoiding accidental stalling of the machine.

The adjusting effect of the fin is chosen in such a manner that even at the steepest position of the aircraft against the surrounding air, there is still a sufficient reserve in regard to the angle of incidence to prevent the machine from getting into the overpulled or "stalled" condition during oscillations or squalls.

All parts of the safety control are so arranged and in consonance to each other by the selection of light building material, by counterbalancing of weights, if necessary by means of additional masses, by computation of the friction of the bearings, etc., that the controlling vane accepts exclusively the direction of the free air-flow and is not influenced in its position by an acceleration of the masses as a result of the motion or position of the aircraft.

The vane 3 must be so large, its arm 7 so long, and all of the transmitting agents so arranged, that the horizontal fin 2 remains perfectly stable in its normal position.

The aircraft with its elevator and the safety device are then forming in regard to their relative positions a stable system if the vane is in action, i. e., the aircraft flies with perfect stability straight ahead with the maximum angle of incidence limited by the safety device.

The vane is preferably to be mounted in such proximity to a vertical line imagined in the centre of gravity that in curving flights an approximate mean value is obtained for the air-flow influencing the vane, though other dispositions would be fairly satisfactory if properly constructed and adjusted. The best and most satisfactory adjustment of the vane by the air current relatively to the position of the aircraft would perhaps not be attained, if the vane were situated on a wing tip, and the aircraft turning about this end. Similarly unfavorable conditions might result from an arrangement of the vane at a great distance from the wings, perhaps in the proximity of the tail end of the aircraft. Care must be course be taken that the vane or auxiliary controlling element is not directly exposed to the slip stream of the propeller or unfavorably influenced in some other way.

For the kinematic connection of fin, elevator and vane, other arrangements may also be used. The desired effect may be attained by another auxiliary surface set in place of the horizontal fin without departing from the invention.

Having thus described my invention, what I claim and desire to protect by Letters Patent is:

1. In an airplane, the combination of an elevator for the longitudinal control and a device for actuating said control and effecting the normal control of the craft with an auxiliary means opposing said elevator control including a vane under the influence of the free air-flow and sensitive to a certain angle of incidence of the craft for counteracting the longitudinal control.

2. In an airplane the combination of the longitudinal control and means for normally actuating the same unhindered within a certain predetermined safe range with a pivoted vane under the influence of the free air-flow and sensitive to an angle of incidence of the craft corresponding to a certain position of said longitudinal control, together with connections between the pivoted vane and the longitudinal control for opposing the action of said control when the latter reaches said certain position.

3. In an airplane, the combination of the longitudinal control and means for normally actuating the same unhindered within a certain predetermined safe range with a pivoted vane under the influence of the free air-flow, together with connections therebetween and the longitudinal control, which permit unhindered the normal variations in the longitudinal control, but upon the attainment of unduly large angles of incidence of the craft functions to counteract further movements of the longitudinal controls corresponding to abnormal angles of incidence.

4. An aircraft capable of unhindered control within a predetermined range of angles of incidence including an element to be operated, a pivoted vane under the influence of the free air-flow and sensitive to predetermined angles of incidence which is adapted to operate said element, and connections whereby the latter is unaffected by said vane during the normal and predetermined permissible variations in angles of incidence of the craft, but operable thereby upon the attainment of an unduly large angle of incidence to reduce the latter.

5. In an aircraft capable of unhindered control within a predetermined range of angles of incidence an element to be operated, a device which is sensitive to angles of incidence of the craft for operating said element, and connections whereby the latter is unaffected by said device during the normal and predetermined permissible variations in angles of incidence of the craft, but operable thereby upon the attainment of an unduly large angle of incidence to reduce the latter.

6. In an aircraft, the combination of a longitudinal control with a mechanism for anticipating and preventing unduly large angles of incidence of the craft before they are reached including a control element sensitive to angles of incidence of the craft and a normally fixed but adjustable horizontal controlling surface together with connections between the said normally horizontal surface and the control element for giving to said horizontal surface a setting tending to counteract the effect of the longitudinal control at a predetermined angle of incidence as determined by the control element.

7. A control of the character set forth in claim 6 in which the longitudinal control includes an elevator mounted for pivotal movements on the normally horizontal but adjustable surface.

8. A control of the character set forth in claim 6 wherein the connections between the auxiliary control element and the normally horizontal but adjustable surface are such that within a predetermined range of variations of angles of incidence the horizontal surface is stably fixed in position while the control element under the influence of the free air-flow is free to follow the direction of the air currents.

9. A control of the character set forth in claim 2 wherein the connections between the pivoted vane and longitudinal control include an actuating cam carried by the vane whose surface is partly concentric and partly eccentric to the pivotal axis of the vane for the purpose set forth.

10. In an aircraft a normally fixed but adjustable longitudinal control element, an elevator pivotally carried by said control element, a pivoted vane under the influence of the air-flow, and connections between said vane, the control element and the elevator, including a connecting link connected at one end by means of a cam to said vane and at the other end to the normally fixed control element by means of a connection adjustable in a direction towards and away from the pivotal axis of the control element and connections between the elevator and said sliding connection to shift said connection when the elevator is operated.

11. A control of the character set forth in claim 10 wherein the upward settings of the elevator bring the sliding connection nearer the pivotal axis of the normally fixed control element for the purpose set forth.

12. A control of the character set forth in claim 13 wherein the safety vane is so arranged with reference to the vertical axis through the center of gravity of the aircraft and the structural parts thereof are arranged, harmonized and balance in such manner that the correct relative positions cannot be altered by acceleration of the masses as a result of motion or position of the aircraft or the correct influence of the air-flow upon the vane is not disturbed.

13. In an aeroplane the combination of a longitudinal control and means for actuating said control unhindered to effect the normal control of the craft, with a controlling wind vane disposed in the free air stream and sensitive to certain angles of incidence of the craft and operative connections therewith, said vane and connections permitting the normal operation of the longitudinal control unhindered but upon the attainment of predetermined angles of incidence operative to oppose the action of the normal control.

14. In an aeroplane the combination of a longitudinal control and means for actuating said control unhindered to effect the normal control of the craft, with a vane disposed in the free air flow and sensitive to abnormal angles of incidence of the craft and operative means between the controlling vane and the normal control for opposing the action thereof upon the approach of unduly large angles of incidence.

15. In an aircraft the combination of a longitudinal control and means for normally operating said control through a predetermined range of movements unhindered, with a mechanism for anticipating angles of incidence beyond said range including a controlling vane under the influence of the free air flow and sensitive to predetermined angles of incidence, together with connections, for opposing the longitudinal controls and preventing angles of incidence beyond the predetermined range.

16. In a craft of the character set forth in claim 13 in which the controlling vane is disposed in such close proximity to the wings that even with very narrow curves and other sudden maneuvers the vane takes its position corresponding to the direction of the movement of the wings towards the air.

17. In an aircraft including the normally used controls for varying the angle of incidence of the craft and in addition thereto a safety mechanism for preventing the stalling of the craft, the latter including a controlled device which directly affects the flying position of the aircraft and a controlling wind vane which, upon the angle of incidence of the wings approaching a dangerous limit, is responsive to the abnormal angle of incidence and operable by the free air stream to operate said controlled device.

18. An aircraft which is capable of normal longitudinal control movements unhindered within a predetermined range of angles of incidence, including a device for modifying the flying position or attitude of the craft and a controlling wind vane disposed in the free air stream and operative connections therefor, said vane and operative connections permitting the normal control movements unhindered within said predetermined range of angles of incidence but operable upon the attainment of an angle of incidence beyond the predetermined range to operate said device and thereby reduce the angle of incidence.

19. In an aircraft the combination of a control surface to be manipulated and means operating the same for effecting unhindered certain normal control movements of the craft, with an independent control element which is sensitive and responsive to predetermined abnormal control movements of the craft and operative connections for opposing the abnormal control movements.

20. In an aircraft the combination of a controlling vane disposed in the direction of the free air flow, a longitudinal control mechanism for controlling the elevation of the craft, and means under the control of the vane for opposing the longitudinal control and preventing unduly large angles of incidence.

Dated this 2nd day of July, 1924.

ADOLF ROHRBACH.